United States Patent [19]
Maaz et al.

[11] Patent Number: 4,997,051
[45] Date of Patent: Mar. 5, 1991

[54] COMPACT BALANCE

[75] Inventors: Günther Maaz, Uslar; Eduard Bierich, Hann-Münden; Klaus Dardat, Dransfeld, all of Fed. Rep. of Germany

[73] Assignee: Sartorius GmbH, Göttingen, Fed. Rep. of Germany

[21] Appl. No.: 406,423

[22] Filed: Sep. 11, 1989

[30] Foreign Application Priority Data

Sep. 16, 1988 [DE] Fed. Rep. of Germany ....... 3831504

[51] Int. Cl.$^5$ .................... G01G 7/00; G01G 21/00
[52] U.S. Cl. .................................. 177/212; 177/126
[58] Field of Search ............... 177/210 EM, 212, 126, 177/127

[56] References Cited

U.S. PATENT DOCUMENTS 4,799,561 1/1989 Komoto ..................... 177/212 X
4,825,968 5/1989 Maaz et al. ................... 177/212

FOREIGN PATENT DOCUMENTS 1100342 1/1968 United Kingdom ............... 177/126

Primary Examiner—George H. Miller, Jr.
Attorney, Agent, or Firm—Eric P. Schellin

[57] ABSTRACT

A compact balance with a system carrier including a vertical plate, with a balance scale carrier including a vertical plate, whereby the plane of the system carrier and the plane of the balance scale carrier are parallel to one another, with at least three guide rods which run vertically to the plane of the system carrier and connect the balance scale carrier in the form of a parallel guide to the system carrier and with a balance scale fastened in a hinged fashion to the balance scale carrier that a lever is mounted on the system carrier which lever extends parallel to the plane of the system carrier in the space surrounded by the system carrier and the balance scale carrier and that a coupling element connects the one lever arm of the lever to the balance scale carrier whereas a coil for the electromagnetic compensation of force is fastened to the other lever arm of the lever.

13 Claims, 4 Drawing Sheets

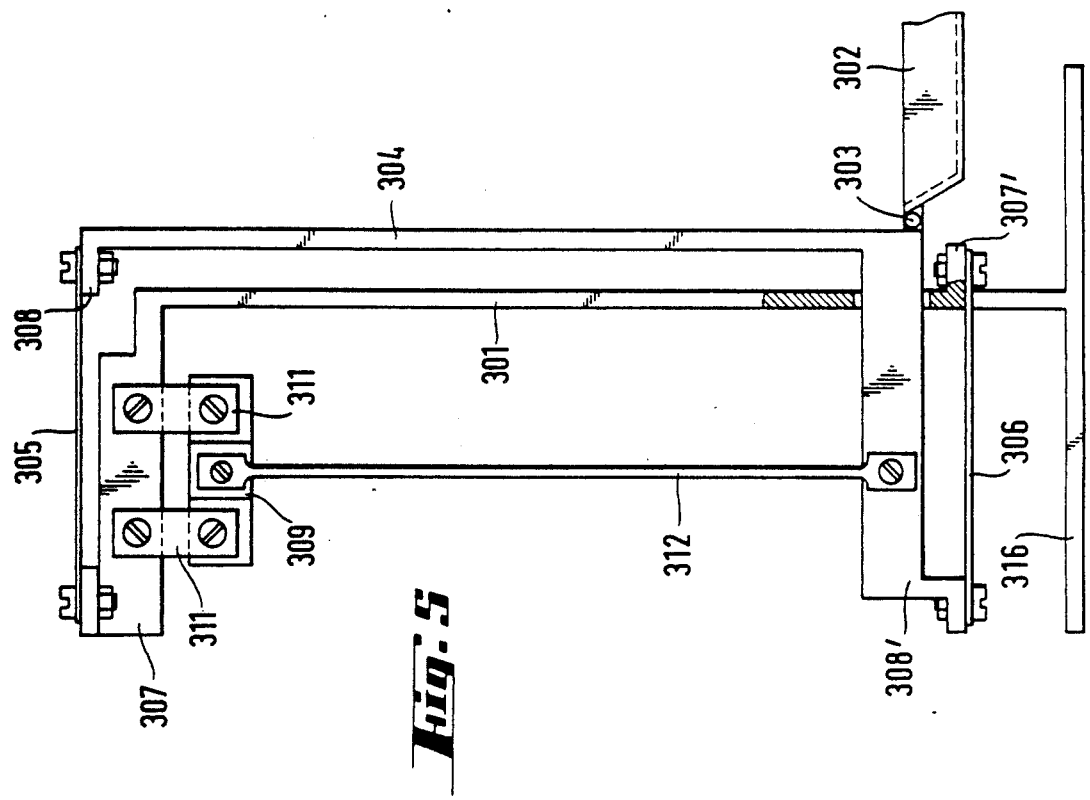
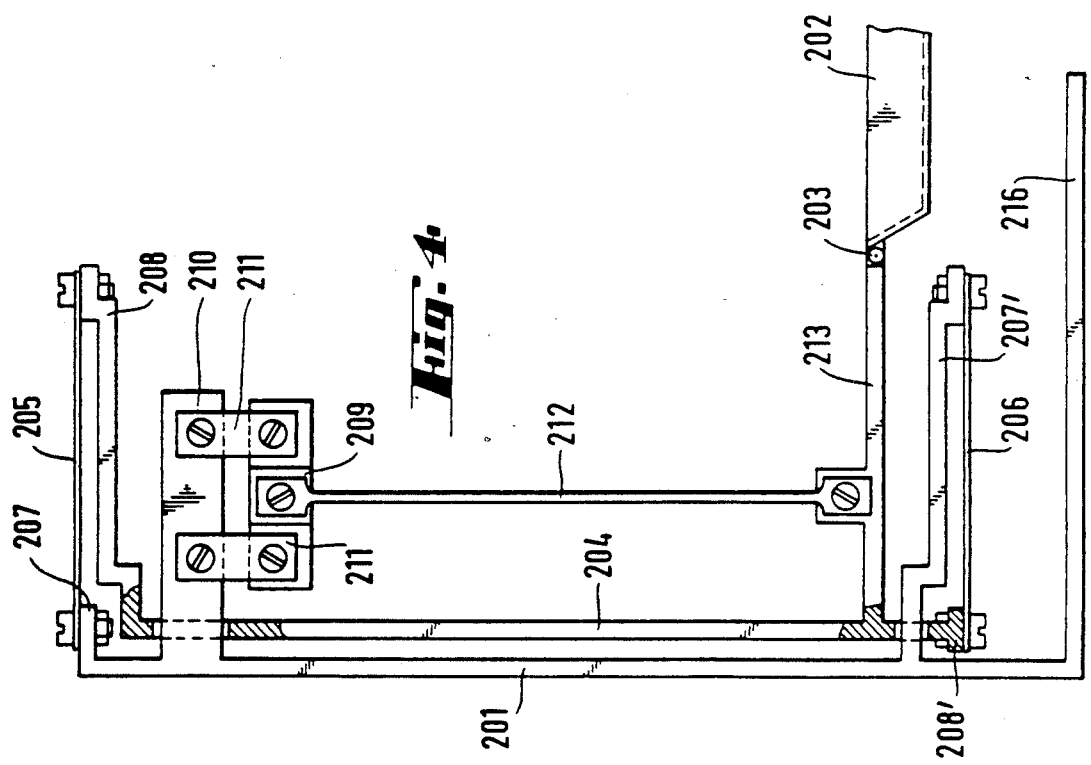

4,997,051

COMPACT BALANCE

BACKGROUND OF THE INVENTION

The invention relates to a compact balance with a system carrier consisting of a vertical plate, with a balance scale carrier including a vertical plate, whereby the plane of the system carrier and the plane of the balance scale carrier are parallel to one another, with at least three guide rods which run vertically to the plane of the system carrier and connect the balance scale carrier in the form of a parallel guide to the system carrier and with a balance scale fastened in a hinged fashion to the balance scale barrier.

A balance of this type is known from W. German patent document DE-AS 1 146 272.

Electronic balances in accordance with the principle of the electromagnetic compensation of force are also generally known (W. German patent document DE-OS 33 40 512). However, customary electronic balances exhibit a large base area, so that the use of these designs for compact balances of the above mentioned type would result in a large increase in volume. It is also not possible to use the weighing cell known e.g. from W. German patent document DE-PS 32 43 350 and milled out of a metal block, since this weighing cell does not constitute a good parallel guide for a laterally positioned balance scale on account of its narrow design.

The invention therefore has the problem of depicting a design for a balance of the above mentioned type which makes an electronic design possible without increasing the volume to any appreciable extent.

SUMMARY OF THE INVENTION

The invention solves this problem in that a lever is mounted on the system carrier which lever extends parallel to the plane of the system carrier in the space surrounded by the system carrier and the balance scale carrier and that a coupling element connects the one lever arm of the lever to the balance scale carrier whereas a coil for the electromagnetic compensation of force is fastened to the other lever arm of the lever which coil dips into an air gap of a permanent magnet fastened to the system carrier.

In this arrangement of the lever parallel to the plane of the system carrier the latter therefore extends rotated through 90° relative to the guide rods, or, in other words: The axis of rotation of the lever is rotated through 90° relative to the four axes of rotation of the parallel guide. In contrast thereto, in customary combinations of a lever and a parallel guide, the axis of rotation of the lever is always parallel to the four axes of rotation of the parallel guide. As a result of the arrangement of the invention, a normal lever length becomes possible in spite of the compactness and the guide rods of the parallel guide are only loaded with traction or pressure in the case of a lateral arrangement of the balance scale on the balance scale carrier.

BRIEF DESCRIPTION OF THE DRAWINGS

The invention is described in the following with reference made to the schematic figures.

FIG. 4 shows a third embodiment in a side view.

FIG. 5 shows a fourth embodiment in a side view.

Figure 1:
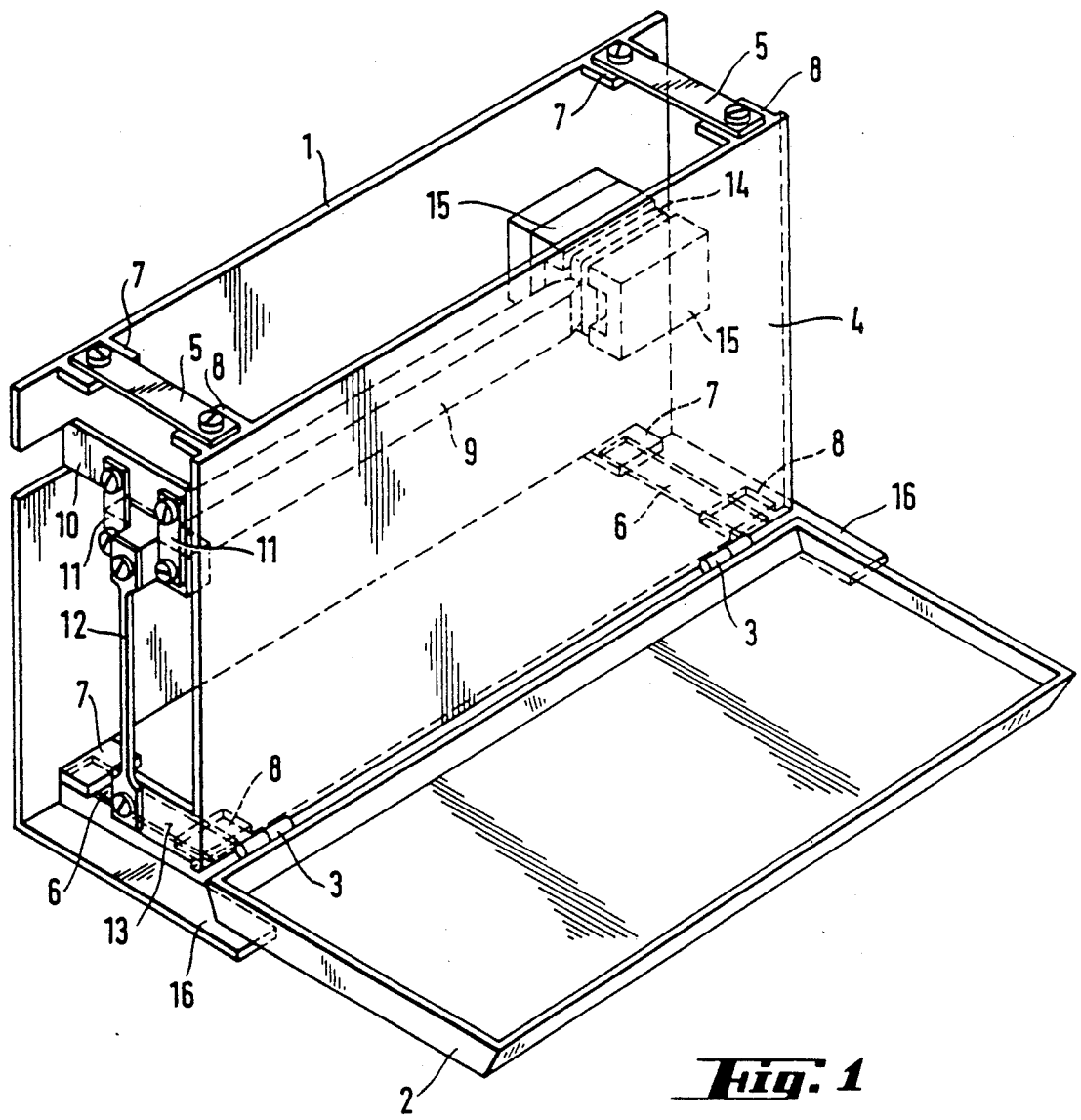
FIG. 1 shows a perspective view of a first embodiment.
Figure 2:
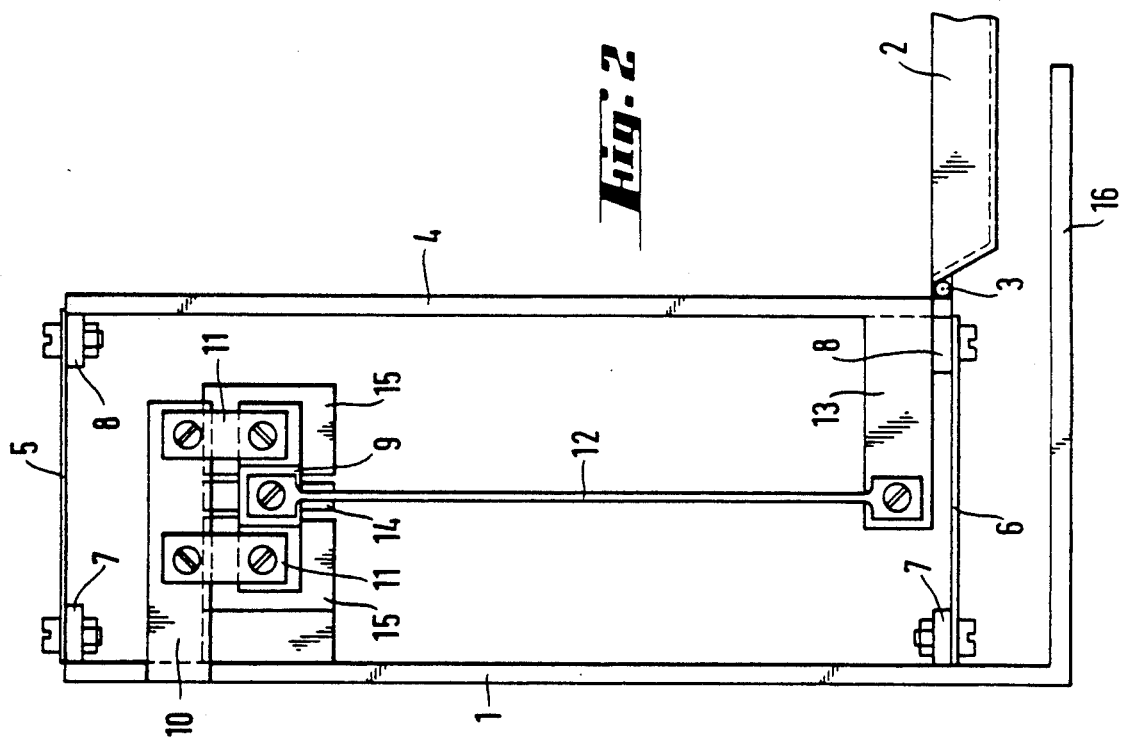
FIG. 2 shows a side view of the embodiment of FIG. 1.

The perspective view of FIG. 1 and the side view of FIG. 2 show the system carrier 1, which forms the back wall of the balance and furnishes the fastening points for the other components of the balance. System carrier 1 stands on feet 16. Balance scale 2 is fastened via articulations 3 to balance scale carrier 4. Balance scale carrier 4 is connected for its part via two upper guide rods 5 and two lower guide rods 6, which form a parallel guide, to system carrier 1. The fastening of guide rods 5, 6 takes place on bent areas 7 on system carrier 1 and on bent areas 8 on balance scale carrier 4. Naturally, the two guide rods can be replaced either on top or below by a single, central guide rod.

Balance scale carrier 4 is rendered transparent in FIG. 1 so that the funtional parts of the balance covered by it can be recognized. In reality, balance scale carrier 4 is of course manufactured e.g. as a stamped, bent part out of a sheet of metal, just like system carrier 1 and lever 9 mentioned later.

A lever 9 for a reduction of force is located in the space between system carrier 1 and balance scale carrier 4. This lever 9 is pivotably mounted via spring articulations 11 to a forwardly projection arm 10 of system carrier 1. The force corresponding to the weight of the material to be weighed (including balance scale 2 and balance scale carrier 4) is transferred from projecting arm 13 on balance scale barrier 4 via thin coupling element 12 onto the shorter lever arm of lever 9. An approximtaly rectangular coil 14 is fastened to the longer lever arm of lever 9, which coil is located in the air gap of two C-shaped permanent magnets 15 fastened to system carrier 1.

The current through coil 14 is regulated thereby in a known manner by a (not shown) electronic position sensor and a control circuit in such a manner that equilibrium prevails on lever 9. As a result of the reduction of force of lever 9, the force to be electromagnetically generated is considerably smaller than the weight of the material to be weighed, so that small coils and small magnets suffice. As a result of the position of lever 9 parallel to the plane of system carrier 1 and to the plane of balance scale carrier 4 - and thus rotated therewith through 90° relative to guide rods 5, 6 - in conjunction with the arrangement of coupling element 12 entirely on the side of balance scale carrier 4, the full length of system carrier 1 and of balance scale carrier 4 is available as lever length, so that a high force reduction ratio can be readily achieved. If one half the length of system carrier 1 and of balance scale carrier 4 is sufficient as lever length, then coupling element 12 can of course also be attached in the middle of balance scale carrier 4. The loading of the parallel guide is then minimum, e.g. guide rods 5, 6 are then loaded only with traction or pressure in the case of a central position of the material to be weighed on balance scale 2.

The electronic circuitry (not shown) of the balance can be located in the space between system carrier 1 and balance scale carrier 4 underneath lever 9 and can be accessed e.g. through an opening in system carrier 1. The display of the result of weighing can be located e.g. either above the two upper guide rods 5 or just behind balance scale carrier 4 (behind a transparent window in balance scale carrier 4). The current supply for the electronic circuitry can take place in a known manner by a separate main part, a chargeable accumulator or a battery.

Figure 3:
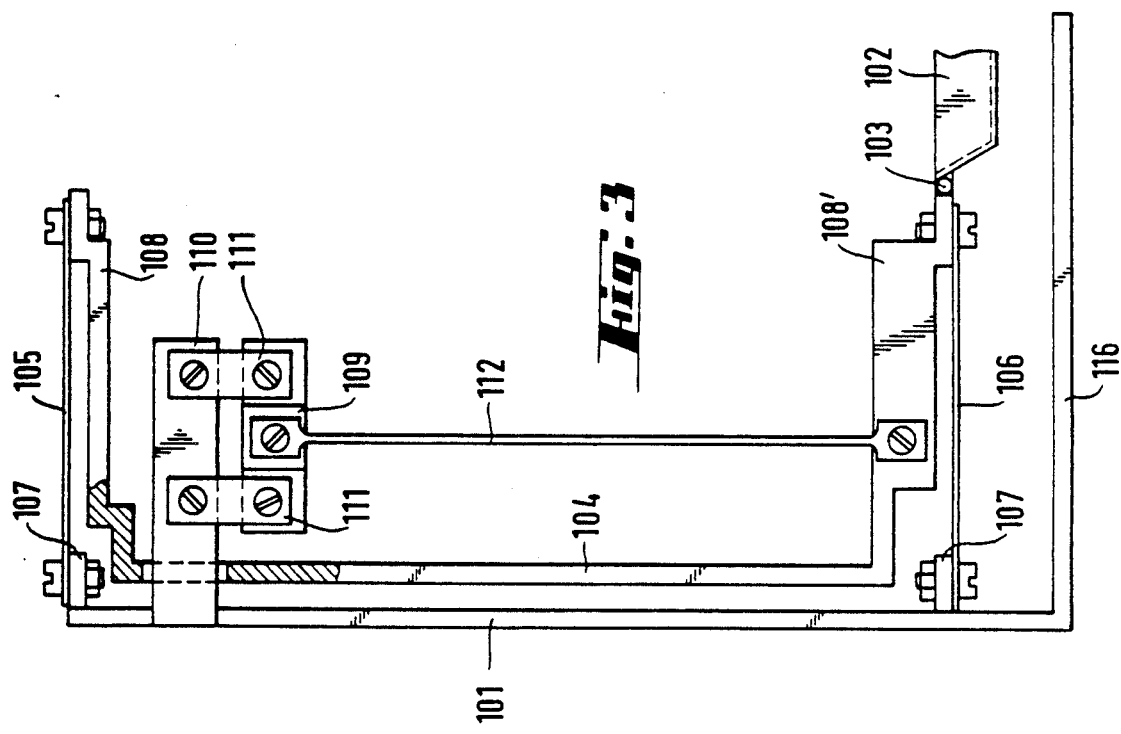
FIG. 3 shows a second embodiment in a side view.

FIG. 3 shows a second embòdiment of the balance in a side view. System carrier 101 with its foot 116 and fastening points 107 for upper guide rods 105 and for lower guide rods 106 is designed as in the first embodiment. However, balance scale carrier 104 comprises much longer bent areas 108, 108'. These bent areas 108, 108' are almost exactly as long as guide rods 105, 106, so that the vertical area of balance scale carrier 104 is located at only a short distance from the vertical part of system carrier 101. Arm 110 on the system carrier extends through an opening in balance scale carrier 104 and carries lever 109 in its front area via spring elements 111. The transfer of force from balance scale 102 takes place again via a thin coupling element 112. The electronic circuitry of the balance can be accessible from the front in this embodiment and be housed underneath lever 109 in the space surrounded by balance scale carrier 104 with its bent areas 108, 108'.

FIG. 4 shows a third embodiment of the balance in a side view. System carrier 201 comprises a short, bent area 107 on its top, which area functions as fastening point for the left (in FIG. 4) end of upper guide rods 205. In contrast thereto, bent area 207' in the lower area of system carrier 201 is designed to be so long that it can function as fastening point for the right end of lower guide rods 206. In a corresponding manner, balance scale carrier 204 comprises a long, bent area 208 on top on which the right end of upper guide rods 205 is fastened and a short, bent area 208' below to which the left end of lower guide rods 206 is fastened. Lever 209 is mounted on arm 210, which extends through an opening in the vertical part of balance scale carrier 204. Coupling element 212 is fastened to arm 213 of balance scale carrier 204 and transfers the weight of the material to be weighed onto the shorter lever arm of lever 209. Balance scale 202 is also fastened to arm 213. The electronic circuitry can be housed in the space underneath lever 209, just as in the embodiment according to FIG. 3. The advantage of this embodiment, in which balance scale carrier 204 and system carrier 201 penetrate one another, resides in the fact that both upper guide rods 205 and lower guide rods 206 can be loaded with traction by laterally located balance scale 202 and can therefore be made especially thin.

FIG. 5 shows a fourth embodiment of the compact balance. This embodiment is distinguished from the third embodiment according to FIG. 4 in that the vertical areas of system carrier 301 and of balance scale carrier 304 are shifted onto the right side facing balance scale 302. In a corresponding manner, system carrier 301 comprises a long, bent area 307 on top to which the left end of upper guide rods 305 is fastened and to which springs 311 for the mounting of lever 309 are fastened at the same time. System carrier 301 comprises only a short, bent area 307' at the bottom of which the right end of lower guide rods 306 is fastened. Balance scale carrier 304 then comprises only a short, bent area 308 on top to which the right end of upper guide rods 305 is fastened whereas bent area 308' on the bottom is long; both the left end of lower guide rods 306 and also coupling element 312 are fastened to this bent area 308'. The electronic circuitry can be located underneath lever 309 in this embodiment and can be accessed from the rear. The additional advantage of this fourth embodiment over the third embodiment according to FIG. 4 resides in the lower number of mutual penetrations of the system carrier and of the balance carrier.

Figure 6:
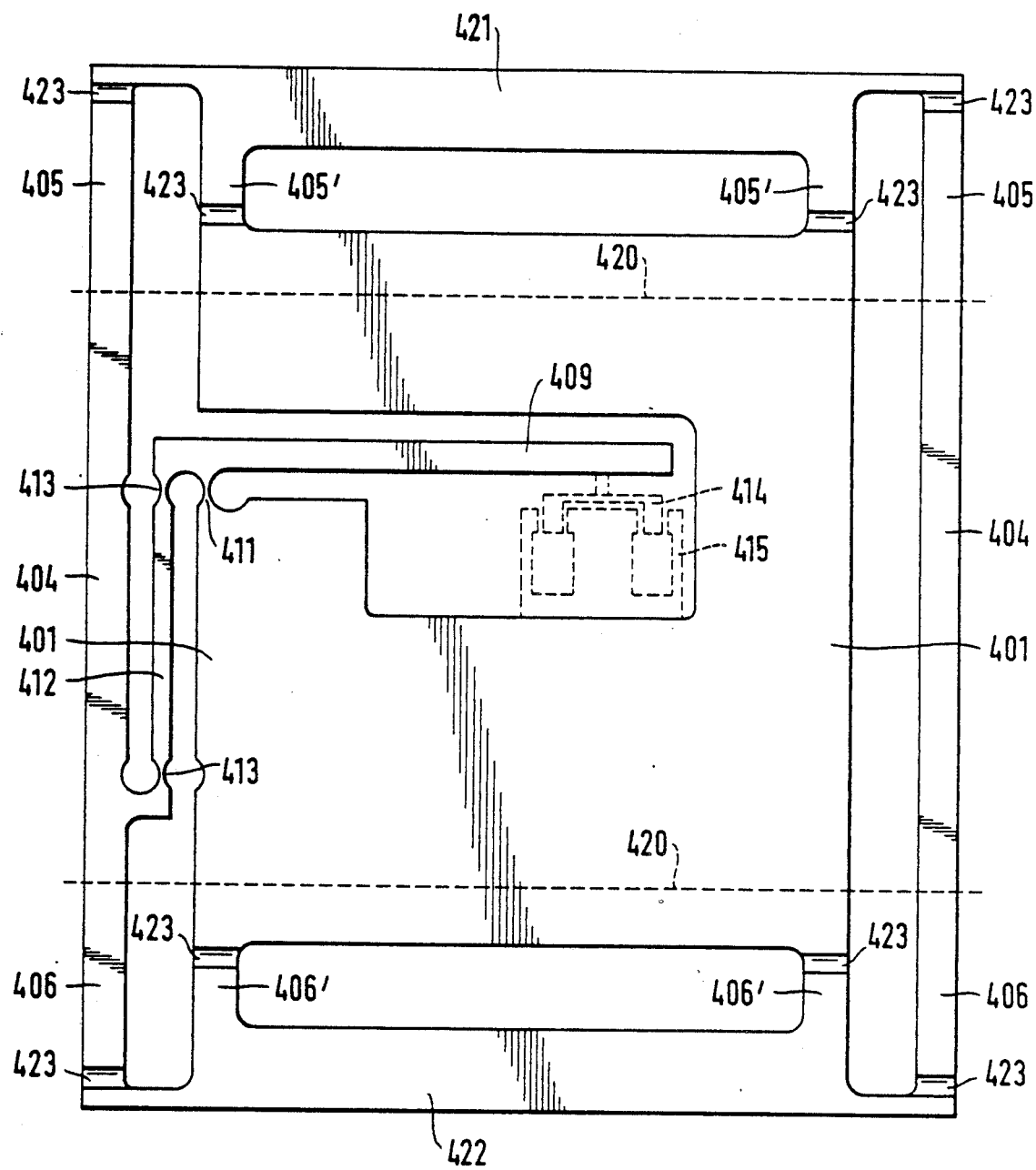
FIG. 6 shows a fifth embodiment as a punched, bent part in a developed projection.

FIG. 6 shows a fifth embodiment. This embodiment can be manufactured e.g. from a stamped, bent part which comprises the essential parts of the balance. This embodiment is therefore shown in FIG. 6 as a development of a stamped, bent part. System carrier 401 and balance scale carrier 404, which consists of two partial area, can be recognized; these two partial areas of the balance scale carrier are connected to each other and thus obtain sufficient stability e.g. by means of a strut in a manner which is not shown, which strut also carries the hinge device for balance scale. The Figure also shows lever 409 which is connected by thin web 411 to system carrier 401. Coupling element 412 is likewise a component of the stamped, bent part and comprises thin areas 413 at its ends for an articulated connection to lever 409 and balance scale carrier 404. Coil 414 and magnet 415 are indicated only in dotted lines as they are not components of the stamped, bent part.

The guide rods are created in that the stamped, bent part is bent e.g. to the rear by 90° along the two dotted lines 420. As a result, guide rods 405, 405' and 406, 406' run horizontally whereas system carrier 401 and balance scale carrier 404 run in a vertical plane. Balance scale carrier 404 is therewith connected in a vertically movable manner via a parallel guide to system carrier 401.

The two upper guide rods 405/405' and the two lower guide rods 406/406' are designed in a U shape, whereby the one shank 405, 406 of the "U" is connected to balance scale carrier 404 and the other shank 405', 406' is connected to system carrier 401. In addition, the central parts of the "U" are connected to each other by connecting struts 421, 422 in order to increase the stability. In FIG. 6, each shank of the "U" comprises a thin area 423 as articulation. Of course, each shank can also comprise two thin areas as articulations or the guiderod areas 405, 405', 406, 406' can be designed to be resilient over their entire length by means of an appropriately small thickness.

The embodiment described above as a stamped, bent part can naturally also be manufactured in another form: For example, one can start with a C-shaped extrusion profile and manufacture the recesses in FIG. 6 by milling. In this instance the vertical area (system carrier, balance scale carrier, lever, etc.) can be made thicker (and thus more stable) than the bent area for the guide rods without additional expense. It is also possible to provide thin areas in guide rods which are otherwise rather thick in the extrusion profile already. Of course, the entire part can be also be manufactured in its final shape as a casting, in which instance slides in the casting mould are only necessary for the recesses in the area of the guide rods.

The balance is particularly well-suited by virtue of its compact design for weighing jewelry and gems.

What is claimed is:

1. A compact balance with a system carrier including a vertical plate, with a balance scale carrier including a vertical plate, whereby the plane of the system carrier and the plane of the balance scale carrier are parallel to one another, with at least two guide rods which run vertically to the plane of the system carrier and connect the balance scale carrier in the form of a parallel guide to the system carrier and with a balance scale fastened in a hinged fashion to the balance scale carrier, comprising a lever mounted on the system carrier which lever extends parallel to the plane of the system carrier in the space defined by the system carrier and the balance scale carrier and a coupling element connects the one lever arm of the lever to the balance scale carrier whereas a coil for the electromagnetic compensation of force is fastened to the other lever arm of the lever which coil dips into an air gap of a permanent magnet fastened to the system carrier.

2. The compact balance according to claim 1, wherein the system carrier and the balance scale carrier are designed as a stamped, bent part.

3. The compact balance according to claim 2, wherein the system carrier, the balance scale carrier and the lever are located substantially in the same vertical plane.

4. The compact balance according to claim 3, wherein the guide rods are U-shaped in design and are fastened by the ends of the two legs to the system carrier and to the balance scale carrier.

5. The compact balance according to claim 3, wherein the guide rods are U-shaped in design and are manufactured together with the system carrier, the balance scale carrier and the lever from one piece.

6. The compact balance according to claim 5, wherein the coil of the electromagnetic compensation of force is approximately rectangular in shape and is located in the air gap between two C-shaped magnets.

7. The compact balance according to claim 6, wherein the length of the lever is approximately equal to the length of the system carrier and of the balance scale carrier and that the coupling element laterally contacts the balance scale carrier.

8. The compact balance according to claim 1 wherein the system carrier and the balance scale carrier each comprise bent areas in their upper area and in their lower area which bent areas function as fastening points for the guide rods of the parallel guide.

9. The compact balance according to claim 8, wherein the bent areas in the system carrier and in the balance scale carrier are bent toward each other and that the lever is located between the system carrier and the balance scale carrier.

10. The compact balance according to claim 9, wherein electronic circuitry of the balance is located in the space between system carrier and balance scale carrier.

11. The compact balance according to claim 8, wherein the bent areas in the system carrier and in the balance scale carrier are bent in the same direction, that the bent areas in the balance scale carrier are so dimensioned whereby the vertical part of the balance scale carrier is located at an interval in front of the vertical part of the system carrier and that the lever is located in front of the balance scale carrier.

12. The compact balance according to claim 11, wherein electronic circuitry of the balance is located in front of the vertical part of the balance scale carrier.

13. The compact balance according to claim 8, wherein the balance scale carrier and the system carrier penetrate each other in such a manner that the upper guide rods are fastened to the system carrier by their rear end facing away from the balance, the lower guide rods are fastened to the system carrier by their front end facing the balance scale and the other ends of the guides are fastened to the balance scale carrier.

* * * * *